United States Patent
Li et al.

(10) Patent No.: US 12,469,152 B2
(45) Date of Patent: Nov. 11, 2025

(54) SYSTEM AND METHOD FOR THREE-DIMENSIONAL MULTI-OBJECT TRACKING

(71) Applicant: Toyota Research Institute, Inc., Los Altos, CA (US)

(72) Inventors: Jie Li, Los Altos, CA (US); Rares A. Ambrus, San Francisco, CA (US); Taraneh Sadjadpour, Stanford, CA (US); Christin Jeannette Bohg, Palo Alto, CA (US)

(73) Assignees: Toyota Research Institute, Inc., Los Altos, CA (US); Toyota Jidosha Kabushiki Kaisha, Toyota (JP); The Board of Trustees of the Leland Stanford Junior University, Stanford, CA (US)

( * ) Notice: Subject to any disclaimer, the term of this patent is extended or adjusted under 35 U.S.C. 154(b) by 289 days.

(21) Appl. No.: 18/195,466

(22) Filed: May 10, 2023

(65) Prior Publication Data
US 2024/0153107 A1    May 9, 2024

Related U.S. Application Data

(60) Provisional application No. 63/421,346, filed on Nov. 1, 2022.

(51) Int. Cl.
*G06T 19/00* (2011.01)
*G06T 7/246* (2017.01)

(52) U.S. Cl.
CPC .............. *G06T 7/248* (2017.01); *G06T 19/00* (2013.01); *G06T 2207/10028* (2013.01);
(Continued)

(58) Field of Classification Search
None
See application file for complete search history.

(56) References Cited

U.S. PATENT DOCUMENTS

| | | | |
|---|---|---|---|
| 10,713,491 B2 | 7/2020 | Zhu et al. | |
| 2021/0072391 A1* | 3/2021 | Li | G06V 10/764 |

OTHER PUBLICATIONS

Chiu, Hsu-kuang, et al. ("Probabilistic 3D multi-modal, multi-object tracking for autonomous driving." 2021 IEEE international conference on robotics and automation (ICRA). IEEE, 2021.).*

(Continued)

*Primary Examiner* — Devona E Faulk
*Assistant Examiner* — Dan F Kalhori
(74) *Attorney, Agent, or Firm* — Christopher G. Darrow; Darrow Mustafa PC

(57) ABSTRACT

Systems and methods for performing three-dimensional multi-object tracking are disclosed herein. In one example, a method includes the steps of determining a residual based on augmented current frame detection bounding boxes, augmented previous frame detection bounding boxes, augmented current frame shape descriptors, and augmented previous frame shape descriptors and predicting an affinity matrix using the residual. The residual indicates a spatiotemporal and shape similarity between current detections in a current frame point cloud data and previous detections in a previous frame point cloud data. The affinity matrix indicates associations between the previous detections and the current detections, as well as the augmented anchors.

17 Claims, 6 Drawing Sheets

(52) U.S. Cl.
CPC .......... *G06T 2207/30252* (2013.01); *G06T 2210/12* (2013.01); *G06T 2210/56* (2013.01)

(56) References Cited

OTHER PUBLICATIONS

Sun, ShiJie, et al. "Deep affinity network for multiple object tracking." IEEE transactions on pattern analysis and machine intelligence 43.1 (2019): 104-119.*

Chiu et al. "Probabilistic 3d multi-modal, multi-object tracking for autonomous driving." 2021 IEEE International Conference on Robotics and Automation (ICRA). IEEE, 2021.

Ross Girshick, "Fast r-cnn." Proceedings of the IEEE international conference on computer vision. 2015.

Yin et al. "Center-based 3d object detection and tracking." Proceedings of the IEEE/CVF conference on computer vision and pattern recognition. 2021.

Meyer et al. "Message passing algorithms for scalable multitarget tracking." Proceedings of the IEEE 106.2 (2018): 221-259.

Wang et al. "DeepFusionMOT: A 3D Multi-Object Tracking Framework Based on Camera-LiDAR Fusion With Deep Association." IEEE Robotics and Automation Letters 7.3 (2022): 8260-8267.

Weng et al. "3d multi-object tracking: A baseline and new evaluation metrics." 2020 IEEE/RSJ International Conference on Intelligent Robots and Systems (IROS). IEEE, 2020.

Liang et al. "Pnpnet: End-to-end perception and prediction with tracking in the loop." Proceedings of the IEEE/CVF Conference on Computer Vision and Pattern Recognition. 2020.

Kim et al. "Eagermot: 3d multi-object tracking via sensor fusion." 2021 IEEE International Conference on Robotics and Automation (ICRA). IEEE, 2021.

Sun et al. "Deep affinity network for multiple object tracking." IEEE transactions on pattern analysis and machine Intelligence 43.1 (2019): 104-119.

Weng et al. "A baseline for 3d multi-object tracking." arXiv preprint arXiv:1907.03961 1.2 (2019): 6.

Stearns et al. "SpOT: Spatiotemporal Modeling for 3D Object Tracking." Computer Vision-ECCV 2022: 17th European Conference, Tel Aviv, Israel, Oct. 23-27, 2022, Proceedings, Part XXXVIII. Cham: Springer Nature Switzerland, 2022.

* cited by examiner

SYSTEM AND METHOD FOR THREE-DIMENSIONAL MULTI-OBJECT TRACKING

CROSS-REFERENCE TO RELATED APPLICATION

This application claims priority to U.S. Provisional Patent Application No. 63/421,346 filed Nov. 1, 2022, the contents of which are hereby incorporated by reference in its entirety.

TECHNICAL FIELD

The subject matter described herein relates, in general, to systems and methods for three-dimensional multi-object tracking.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Multi-object tracking (MOT) is a task in computer vision that involves detecting and tracking multiple objects using sensor data. Robotic systems, such as autonomous vehicles, use MOT for planning and guidance. Generally, the quality_of tracking is largely dependent_on the quality of the detector used. Because of the danger of failing to detect an object, it is generally preferable to over-detect objects. This over-detection results in 3D detectors that produce high rates of false positives to ensure a low number of false negatives. This can negatively affect tracking by complicating data association and track lifecycle management. Additionally, occasional false-negative detections due to difficult scenarios like occlusions_can harm tracking performance.

SUMMARY

This section generally summarizes the disclosure and is not a comprehensive explanation of its full scope or all its features.

In one embodiment, a method for three-dimensional multi-object tracking includes determining a residual based on augmented current frame detection bounding boxes, augmented previous frame detection bounding boxes, augmented current frame shape descriptors, and augmented previous frame shape descriptors and predicting an affinity matrix using the residual. The residual indicates a spatiotemporal and shape similarity between current detections in a current frame point cloud data and previous detections in a previous frame point cloud data. The affinity matrix indicates associations between the previous detections and the current detections.

In another embodiment, a system for three-dimensional multi-object tracking includes a processor and a memory having instructions. When executed by the processor, the instructions cause the processor to determine a residual based on augmented current frame detection bounding boxes, augmented previous frame detection bounding boxes, augmented current frame shape descriptors, and augmented previous frame shape descriptors and predict an affinity matrix using the residual. Like before, the residual indicates a spatiotemporal and shape similarity between current detections in a current frame point cloud data and previous detections in a previous frame point cloud data, while the affinity matrix indicates associations between the previous detections and the current detections.

In yet another embodiment, a non-transitory computer-readable medium includes instructions for performing three-dimensional multi-object tracking. When executed by a processor, the instructions cause the processor to determine a residual based on augmented current frame detection bounding boxes, augmented previous frame detection bounding boxes, augmented current frame shape descriptors, and augmented previous frame shape descriptors and predict an affinity matrix using the residual. Again, the residual indicates a spatiotemporal and shape similarity between current detections in a current frame point cloud data and previous detections in a previous frame point cloud data, while the affinity matrix indicates associations between the previous detections and the current detections.

Further areas of applicability and various methods of enhancing the disclosed technology will become apparent from the description provided. The description and specific examples in this summary are intended for illustration only and not to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described are systems and methods that perform 3D MOT. The systems and methods described herein model shape and spatio-temporal affinities between tracks and detections in consecutive frames. By understanding objects' shapes and spatio-temporal contexts, the systems and methods described herein improve data association, false-positive (FP) elimination, false-negative (FN) propagation, newborn (NB) initialization, dead track (DT) termination, and track confidence refinement. The systems and methods described herein learn an affinity matrix that encodes shape and spatio-temporal information to obtain a probabilistic matching between detections and tracks. The systems and methods can also learn each frame's representations of FP, NB, FN, and DT anchors. By computing the affinity between detections and tracks to these learned representations, detections can be classified as newborn tracks or false positives, while tracks can be classified as dead tracks or false negatives.

The systems and methods described herein may also be able to perform a sequential track confidence refinement technique that represents track score refinement as a time-dependent problem and leverages information extracted from the shape and spatio-temporal encodings to obtain significant improvements in overall tracking accuracy.

Figure 1A:
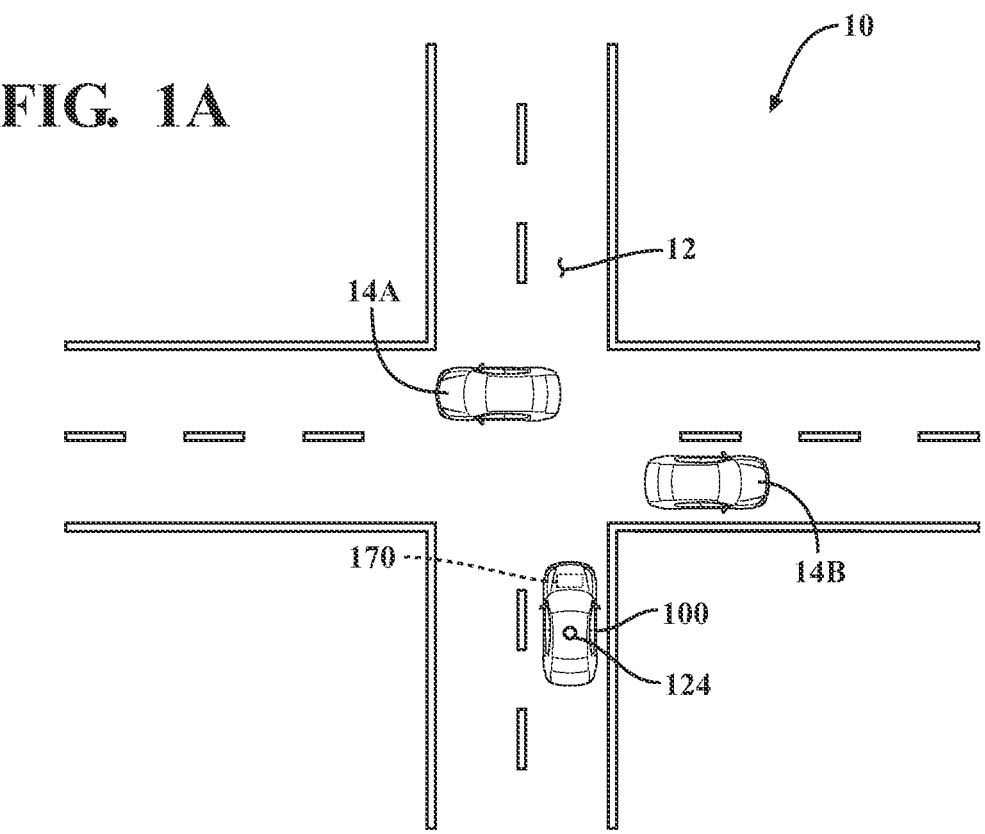
FIGS. 1A and 1B illustrate different examples regarding 3D MOT.
Figure 1B:
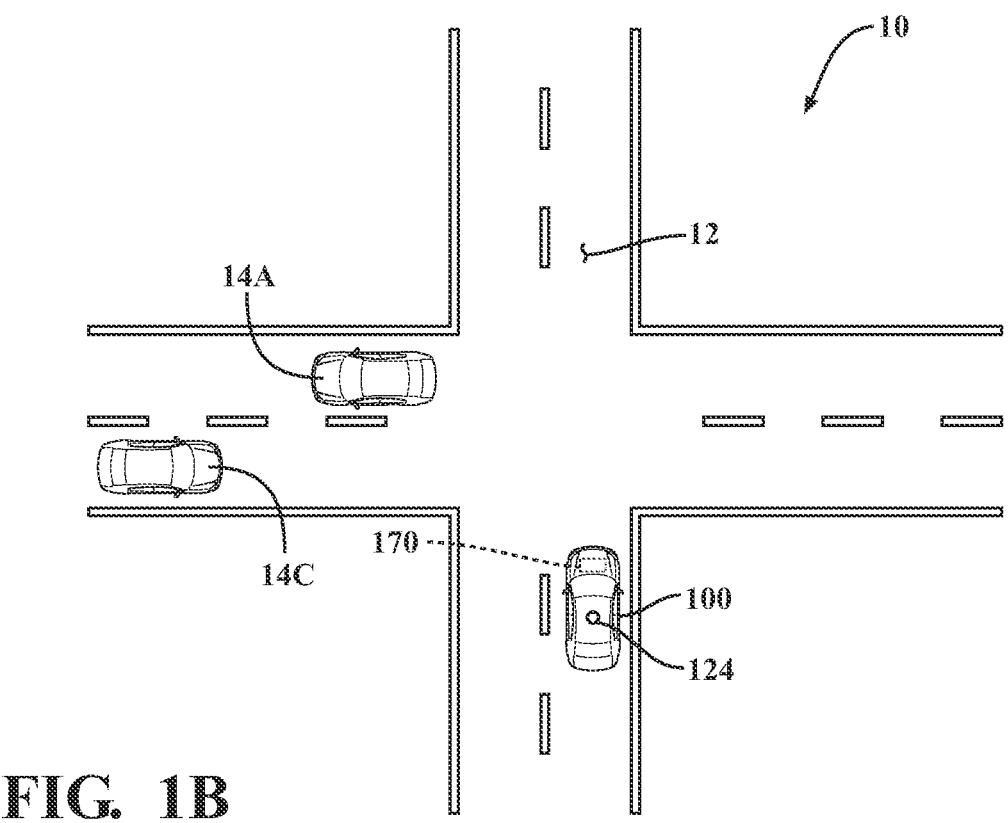

To better understand some of the concepts behind the described systems and methods, reference is made to FIGS. 1A and 1B, which show a scene 10 at two different moments in time. The scene 10 shown in FIG. 1A is taken at a previous time (t=−1), while the scene 10 shown in FIG. 1B is taken at the current time (t=0). Here, the scene 10 includes a vehicle 100 that incorporates one example of a 3D MOT system 170 that can perform 3D MOT using point cloud information collected from a sensor, such as a light detection and ranging (LIDAR) sensor 124. In this example, the vehicle 100 is located on a road system 12. It should be understood that incorporating the 3D MOT system 170 within a vehicle, such as the vehicle 100 is just an example of one application of the 3D MOT system 170. Other vision-related applications, such as robots, security systems, etc., can also utilize the 3D MOT system 170.

In addition to the vehicle 100, other objects are also present on the road system 12. In FIG. 1A (t=−1), these objects include vehicles 14A and 14B. In FIG. 1A (t=0), the vehicle 14A is still within the scene 10 but has moved, the vehicle 14B has exited the scene 10, and a vehicle 14C has entered the scene 10. As such, at two different time steps, the scene 10 can change significantly. Also, it is worth noting that the objects in the scene 10 are vehicles. Still, it should be understood that objects within the scene 10 can include any type of objects, such as pedestrians, cyclists, animals, buildings, or any type of fixed or static element. As will be explained in greater detail throughout this description, the vehicle 100 includes the 3D MOT system 170, which can learn shape and spatiotemporal affinities between tracks and detections in consecutive frames, such as frames representing the scene 10 at two different time steps.

Figure 2:
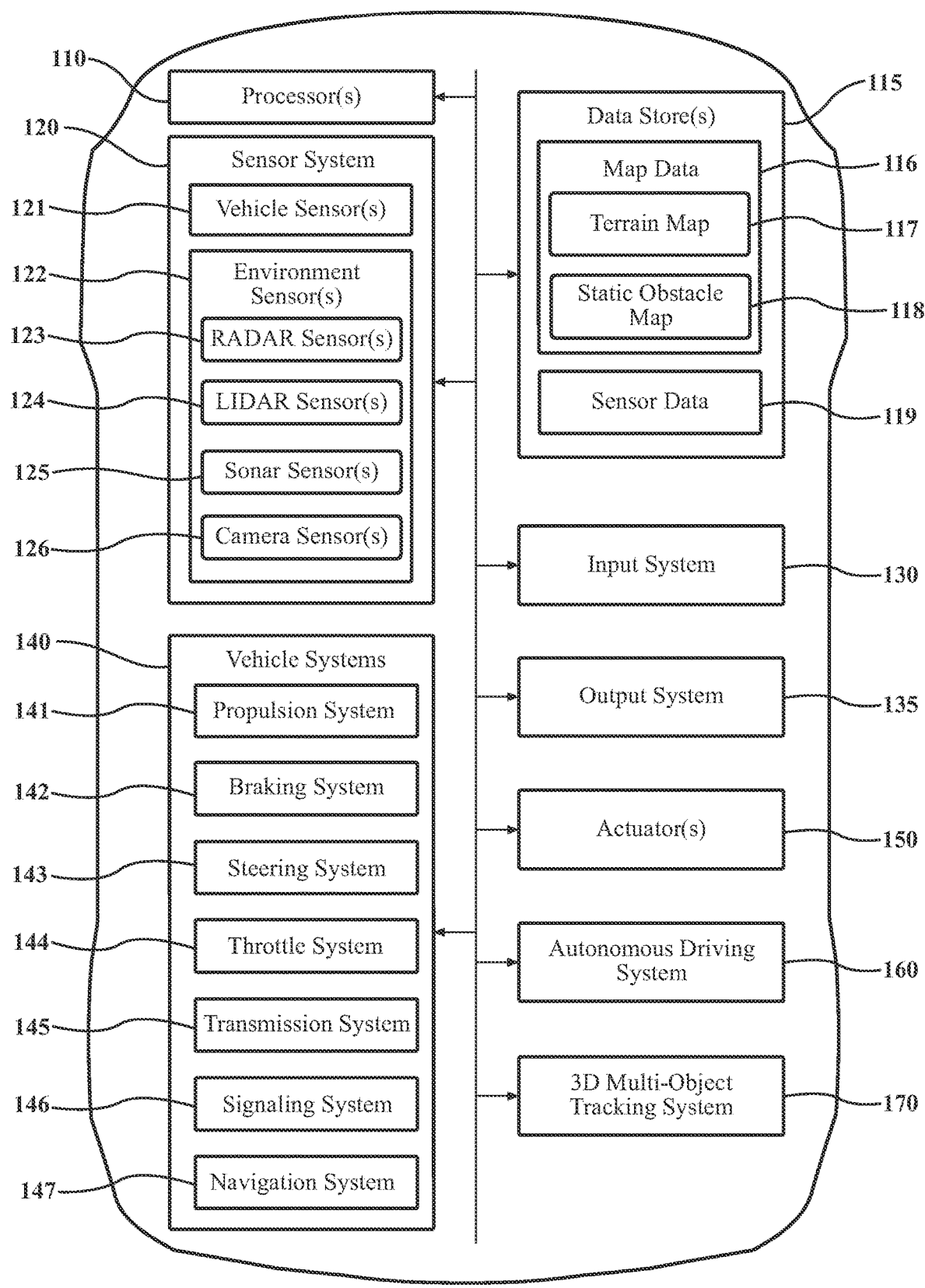
FIG. 2 illustrates an example of a vehicle incorporating a 3D MOT system.

As mentioned before, the 3D MOT system 170 can be used in any one of a number of different applications, especially robotic and/or surveillance applications that need to identify and track objects within a scene that have been detected by a sensor that produces point cloud data. As mentioned, the 3D MOT system 170 may be incorporated within the vehicle 100. A more detailed example of the vehicle 100 is illustrated in FIG. 2. As used herein, a "vehicle" is any form of powered transport. In one or more implementations, the vehicle 100 is an automobile. While arrangements will be described herein with respect to automobiles, it will be understood that embodiments are not limited to automobiles. Again, in some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving system 160.

The vehicle 100 also includes various elements. It will be understood that in various embodiments it may not be necessary for the vehicle 100 to have all of the elements shown in FIG. 2. The vehicle 100 can have any combination of the various elements shown in FIG. 2. Further, the vehicle 100 can have additional elements to those shown in FIG. 2. In some arrangements, the vehicle 100 may be implemented without one or more of the elements shown in FIG. 2. While the various elements are shown as being located within the vehicle 100 in FIG. 2, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 2 and will be described along with subsequent figures. However, a description of many of the elements in FIG. 2 will be provided after the discussion of FIGS. 3-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

Figure 3:
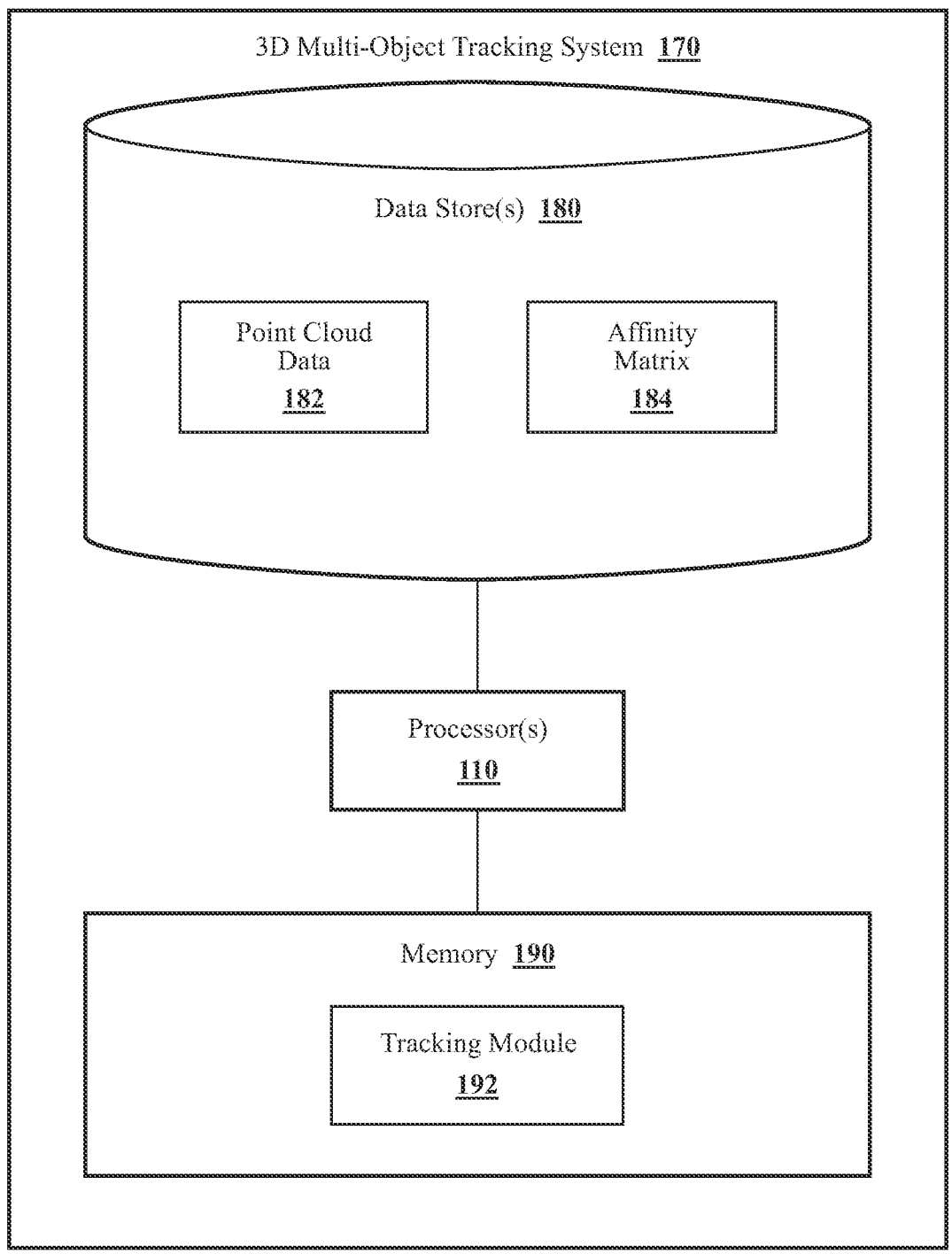
FIG. 3 illustrates a more detailed view of the 3D MOT system.

In either case, the vehicle 100 includes a 3D MOT system 170. The 3D MOT system 170 may be incorporated within the autonomous driving system 160 or may be separate, as shown. With reference to FIG. 3, one embodiment of the 3D MOT system 170 is further illustrated. As shown, the 3D MOT system 170 includes one or more processor(s) 110. Accordingly, the processor(s) 110 may be a part of the 3D MOT system 170, or the 3D MOT system 170 may access the processor(s) 110 through a data bus or another communication path. In one or more embodiments, the processor(s) 110 is an application-specific integrated circuit that is configured to implement functions associated with a tracking module 192. In general, the processor(s) 110 is an electronic processor, such as a microprocessor, capable of performing various functions described herein.

In one embodiment, the 3D MOT system 170 includes a memory 190 that stores the tracking module 192. The memory 190 is a random-access memory (RAM), read-only memory (ROM), a hard disk drive, a flash memory, or other suitable memory for storing the tracking module 192. The tracking module 192 is, for example, computer-readable instructions that, when executed by the processor(s) 110, cause the processor(s) 110 to perform the various functions disclosed herein.

Furthermore, in one embodiment, the 3D MOT system 170 includes one or more data store(s) 180. The data store(s) 180 is, in one embodiment, an electronic data structure such as a database that is stored in the memory 190 or another memory and that is configured with routines that can be executed by the processor(s) 110 for analyzing stored data, providing stored data, organizing stored data, and so on. Thus, in one embodiment, the data store(s) 180 stores data used by the tracking module 192 in executing various functions.

In one embodiment, the data store(s) 180 stores point cloud data 182 and at least one affinity matrix 184. The point cloud data 182 may be a discrete set of data points in space representing a 3D shape or object, such as the objects detected by the LIDAR sensor 124 previously mentioned when describing FIGS. 1A and 1B. While the point cloud data 182 may be generated by one or more LIDAR sensors, such as the LIDAR sensor 124, the point cloud data 182 can also come from other sources as well. For example, the point cloud data 182 may be in the form of a pseudo-point cloud that is generated from image data. More specifically, a pseudo-point cloud may be generated by creating a depth map from image data back-projected into a 3D space.

Figure 4:
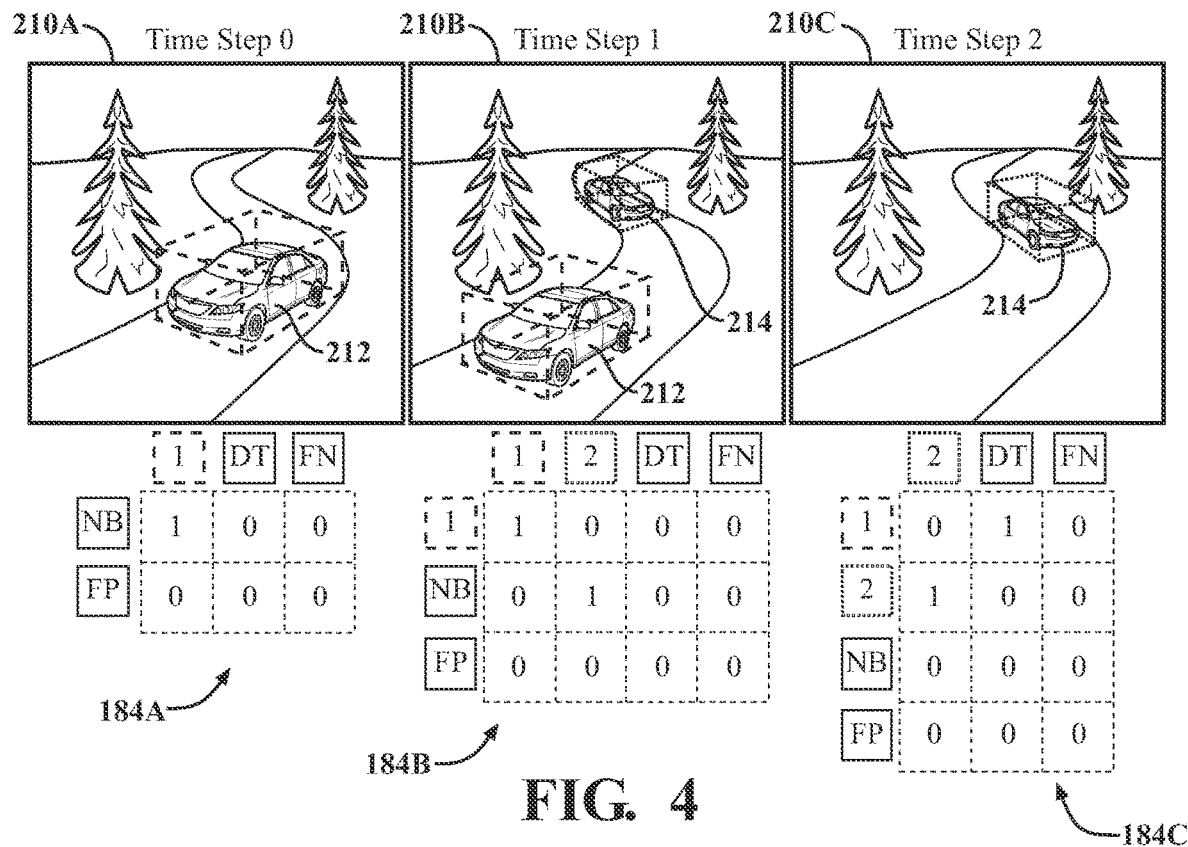
FIGS. 4 and 5 illustrate examples of affinity matrices output by the 3D MOT system of FIG. 3.
Figure 5:
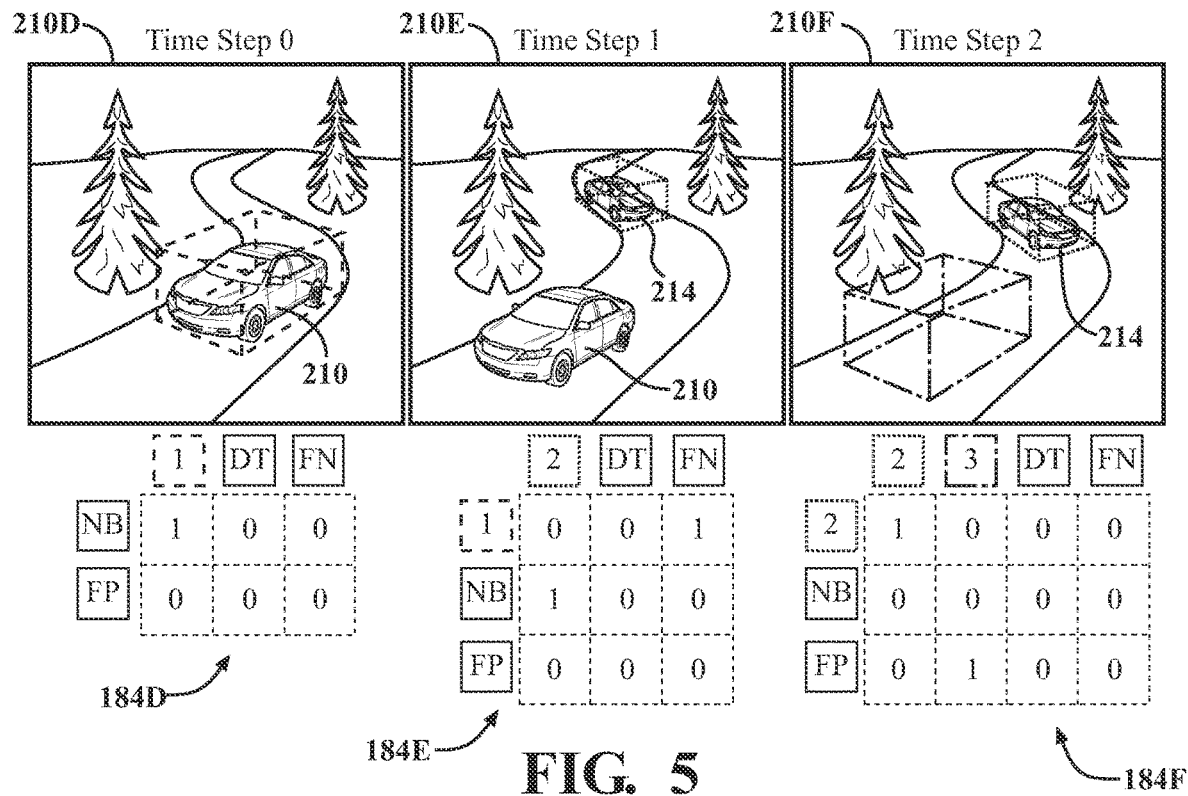

The affinity matrix 184 indicates associations between previous and current detections. The affinity matrix 184 is the output that results from the analysis performed by the 3D MOT system 170 when considering the point cloud data 182 at different time steps. For example, FIGS. 4 and 5 illustrate different examples of affinity matrices 184A-184F. The affinity matrices 184A-184C relate to tracking scenarios 210A-210C, respectively, at time steps t=0, t=1, and t=2. The affinity matrices 184D-184F are ground truth affinity matrices that relate to scenarios 210D-210F, respectively, at time steps t=0, t=1, and t=2.

In the affinity matrices 184A-184F, the rows correlate with previous frame tracks represented with single-history bounding box detections, while the columns correlate with current frame detections. The affinity matrices 184A-184F are augmented with two rows for newborn track (NB) and false-positive (FP) anchors that the current frame detections can match with and two columns for dead track (DT) and false-negative (FN) anchors that the previous frame tracks can match with. These four augmentations are learned representations that capture the essence of these four detection and track types for each frame. The bounding box border style corresponds to the track ID.

At time step t=0, in both FIGS. 4 and 5, start with affinity matrix 184A/184D, where the vehicle 212 is detected and is matched with NB, thus initializing Track 1. For FIG. 4, at t=1, the affinity matrix 184A shows that the vehicle 212 is detected again and matched with the previous frame's Track 1, while the vehicle 214 is detected as a newborn with Track ID 2. Then, at t=2, there is only one detection for the vehicle 214, so it is matched with the previous frame's Track 2, while Track 1 is matched with DT. In FIG. 5, at time step t=1, the vehicle 214 is detected as a newborn with Track ID 2, while the vehicle 212 is not detected at all, so Track 1 from t=1 is matched with FN. Finally, at t=2, the vehicle 214 is detected again and matched with Track 2, while a detection is found in a region with no object, so it is matched with FP in A2.

Figure 6:
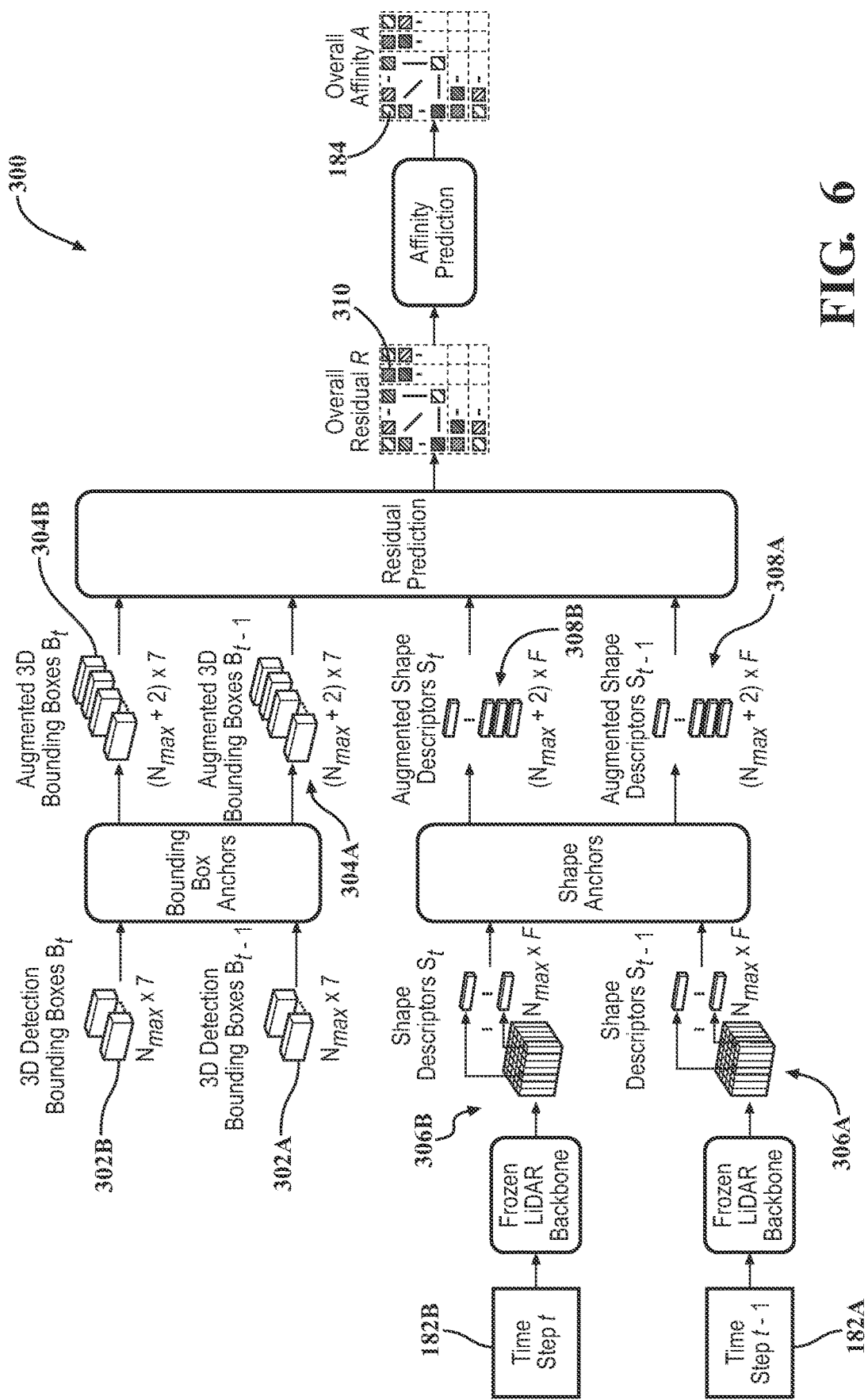
FIG. 6 illustrates a process flow of the 3D MOT system.

As mentioned before, the tracking module 192 includes instructions that cause the processor(s) 110 to perform any one of the functions described herein, namely the 3D tracking of multiple objects. Before describing the details of these functions, reference is made to FIG. 6 provides a flowchart 300 that describes one example of an algorithm that may be utilized by the 3D MOT system 170 for the detection and tracking of multiple objects.

Moreover, the 3D MOT system 170 uses $N_{max}$ low-dimensional bounding boxes 302A and 302B from the current and previous frames to learn bounding box representations for the FP, NB, FN, and DT anchors. The instructions of the tracking module 192 cause the processor(s) 110 to append the FP and NB anchors to previous frame bounding boxes to form the augmented bounding boxes $\hat{B}_{t-1}$ (previous frame augmented bounding boxes 304A), while the FN and DT anchors are added by the processor(s) 110 to the current frame detections to form the augmented bounding boxes $\hat{B}_t$ (current frame augmented bounding boxes 304B).

Using a pre-trained frozen LIDAR backbone, which can be extracted from an off-the-shelf detector, we process point cloud data 182A and 182B to obtain shape descriptors at two different time steps. The instructions of the tracking module 192 cause the processor(s) 110 to utilize current and previous frame shape descriptors 306A and 306B to learn shape representations for the anchors. The learned shape representations for the anchors are appended by the processor(s) 110 to create augmented current and previous frame shape descriptors 308A and 308B, respectively.

The instructions of the tracking module 192 cause the processor(s) 110 to use these augmented bounding boxes 304A and 304B and augmented shape descriptors 308A and 308B to determine a residual 310 that captures the spatio-temporal and shape similarities between current and previous frame detections, as well as between detections and anchors. The residual 310 is then used by the processors(s) 110 to predict the affinity matrix 184 for probabilistic data associations, track lifecycle management, FP elimination, FN propagation, and track confidence refinement.

The affinity matrix 184 can be utilized by the 3D MOT system 170 and/or the autonomous driving system 160 for online tracking. Allowing for up to $N_{max}$ detections per frame, the 3D MOT system 170 estimates the affinity matrix $A \in \mathbb{R}^{(N_{max}+2) \times (N_{max}+2)}$. As shown in FIGS. 4 and 5, the rows of our affinity matrixes 184A-184F represent the previous frame tracks, and the columns represent the current frame detections. The two augmented columns are for the DT and FN anchors so that previous frame tracks can match with DT or FN. Similarly, because current frame detections can match with NB or FP, the affinity matrix 184 has two augmented rows for the NB and FP anchors. Though there can be no more than one match for each bounding box in the current and previous frames, the same is not true for our learned anchors, i.e., more than one current frame bounding box can match with the NB or FP anchors, respectively. To handle this situation, a forward-matching affinity matrix $A_{fm} \in \mathbb{R}^{N_{max} \times (N_{max}+2)}$ can be created by removing the two row augmentations from A and applying a row-wise softmax so that more than one previous frame track can have a sufficient probability to match with the DT and FN anchors, respectively:

$$A_{fm} = \text{softmax}_{row}(A_1). \quad (1)$$

Using similar logic, a backward-matching affinity matrix $A_{bm} \in \mathbb{R}^{(N_{max}+2) \times N_{max}}$ can be created by removing the two column augmentations from A and applying a column-wise softmax so that more than one current frame detection can have a sufficient probability to match with the NB and FP anchors, respectively:

$$A_{bm} = \text{softmax}_{col}(A_2). \quad (2)$$

Here, forward matching indicates the desire to find the best current frame match for each previous frame track, while backward matching refers to finding the best previous frame match for each current frame detection.

The instructions within the tracking module 192 may cause the processor(s) 110 to combine the affinity matrix outputs and the matching algorithm to form tracks. Moreover, the processor(s) 110 takes $A_{fm}$ and labels any previous frame track that has a probability above the threshold $\tau_{dt}$ in the DT column as a DT and forward propagates any previous frame track into the current frame if it has a probability above the threshold $\tau_{fn}$ in the FN column. Therefore, in addition to provided detections, forward propagation creates a new detection for the current frame to handle occluded objects that off-the-shelf detections missed. A box is created by the processor(s) 110 in the current frame $b_t'$: =(x', y', z, w, l, h, $r_y$), by moving the 2D center coordinate of the existing track $b_{t-1}:=(x, y, z, w, l, h, r_y)$ to the next frame based on the estimated velocity provided by the off-the-shelf 3D detector and $\Delta t$ between the two frames, i.e. $x'=x+v_x\Delta t$ and $y'=y+v_y\Delta t$. All previous frame tracks that do not qualify as FN or DT are kept as is. Analogously, the processor(s) 110 may take $A_{bm}$ and remove any current frame detection that has a probability above the threshold $\tau_{fp}$ in the FP row and label any current frame detection with a value above the threshold $\tau_{nb}$ in the NB row as an NB. All current frame detections that do not qualify as FP or NB are kept as is.

The instructions within the tracking module 192 may cause the processor(s) 110 to execute a greedy algorithm. In its original form, the greedy algorithm takes all unmatched detections and initializes NBs with them. However, processor(s) 110 checks if an unmatched detection is labeled as an NB in the affinity matrix based on the threshold $\tau_{nb}$ and whether it is outside the maximum distance threshold with respect to other tracks to initialize it as an NB. Otherwise, it is discarded. Additionally, the processor(s) 110 checks if an unmatched track is labeled as a DT based on the threshold $\tau_{dt}$ and whether it is outside the maximum distance threshold with respect to other detections to terminate it as a DT.

As mentioned before, the 3D MOT system 170 may utilize off-the-shelf 3D detectors, as well as the pre-trained LIDAR backbone used to generate the detections. Moreover, the instructions within the tracking module 192 may cause the processor(s) 110 to first learn bounding box and shape representations for the anchors and later use this information to learn the residual 310 that encodes spatio-temporal and shape similarities not only between current frame detections and previous frame tracks but also between current frame detections and FP and NB anchors or between previous frame tracks and FN and DT anchors. The processor(s) 110 uses the residual 310 to predict affinity matrices 184 that assign probabilities for matching detections to tracks, eliminating FPs, propagating FNs, initializing NBs, and terminating DTs.

The goal of learning bounding box representation for anchors is to learn bounding box representations for each of the FP, FN, NB, and DT anchors in a given frame pair. The aim of the bounding box representation of each anchor is to capture the commonalities between detection bounding boxes that fall under each of these four categories.

Again, the 3D MOT system 170 may utilize off-the-shelf 3D detections, which provide 3D bounding box representations that include each box's center coordinate, dimensions, and yaw rotation angle: $b:=(x, y, z, w, l, h, r_y)$. The processor(s) 110 takes the set up bounding boxes for the current frame $B_t \in \mathbb{R}^{N_{max} \times 7}$ and the previous frame $B_{t-1} \in \mathbb{R}^{N_{max} \times 7}$. The processor(s) 110 fixes the maximum number of bounding boxes taken per frame to be $N_{max}$. The processor(s) 110 zero pads the matrix if there are fewer than $N_{max}$ bounding boxes and samples the top $N_{max}$ detection bounding boxes if there are greater than $N_{max}$ boxes.

The instructions within the tracking module 192 cause the processor(s) 110 to create a learned bounding box representation at time step t for FP and NB anchors using the current frame detections $B_t$ as follows, where each $\sigma$ represents an MLP:

$$b_{fp} = \sigma_{fp}^b(B_t) \quad (3)$$

$$b_{nb} = \sigma_{nb}^b(B_t). \quad (4)$$

Similarly, the instructions within the tracking module 192 cause the processor(s) 110 to find learned bounding box representations for FN and DT anchors using previous frame detections $B_{1-t}$:

$$b_{fn} = \sigma_{fn}^b(B_{t-1}) \quad (5)$$

$$b_{dt} = \sigma_{dt}^b(B_{t-1}). \quad (6)$$

In all four cases, the absolute value is applied to the MLP outputs corresponding to (w, l, h), since the dimensions need to be nonnegative values. The processor(s) 110 then concatenates $b_{fp} \in \mathbb{R}^7$ and $b_{nb} \in \mathbb{R}^7$ to $B_{t-1}$ to get $\hat{B}_{t-1} \in \mathbb{R}^{(N_{max}+2) \times 7}$, as well as $b_{fn} \in \mathbb{R}^7$ and $b_{dt} \in \mathbb{R}^7$ to $B_t$ to get $\hat{B}_t \in \mathbb{R}^{(N_{max}+2) \times 7}$. FP and NB are appended anchors to $B_{t-1}$ so that current frame detections can match them, and the same logic applies to appending FN and DT anchors to $B_t$.

Regarding learning shape representation for anchors, the instructions within the tracking module 192 cause the processor(s) 110 to extract shape descriptors for each 3D detection using the pre-trained LIDAR backbone of an off-the-shelf detector to leverage spatio-temporal and shape information from the raw LIDAR data (i.e., point cloud data 182). Similar to the previous section, the goal is to learn shape representations for the FP, FN, NB, and DT anchors using the shape descriptors from existing detections. These shape descriptors will be used to match detections to each other or one of the anchors if they share similar shape information.

The instructions within the tracking module 192 cause the processor(s) 110 to pass the current frame's 4D LIDAR point cloud with an added temporal dimension into the frozen pre-trained LIDAR backbone used in the off-the-shelf detector, such as CenterPoint. This outputs a bird's-eye-view (BEV) map for the current frame, where each voxelized region encodes a high-dimensional volumetric representation of the shape information in that region. Then, for each current frame detection bounding box, the processor(s) 110 extracts a shape descriptor using bilinear interpolation from the BEV map using the bounding box center, left face center, right face center, front face center, and back face center. The processor(s) 110 concatenates these five shape features to create the overall shape descriptor for each bounding box. Note that in BEV, the box center, bottom face center, and top face center all project to the same point, so the processor(s) 110 forgoes extracting the latter two centers. The processor(s) 110 accumulates all of the shape features extracted for the current frame detections and calls this cumulative shape descriptor $S_t \in \mathbb{R}^{N_{max} \times F}$. The processor(s) 110 repeats the same procedure for the previous frame's LIDAR point cloud and bounding boxes to get the overall shape descriptor.

Using the extracted shape features for the current frame $S_t$, the processor(s) 110 obtain the learned shape descriptors for the FP and NB anchors with MLPs $\sigma_{fp}$ and $\sigma_{nb}$, respectively:

$$s_{fp} = \sigma_{fp}^s(S_t) \quad (7)$$

$$s_{nb} = \sigma_{nb}^s(S_t). \quad (8)$$

Likewise, the processor(s) 110 uses the previous frame's shape features $S_{t-1}$ to learn shape descriptors for FN and DT anchors as such:

$$s_{fn} = \sigma_{fn}^s(S_{t-1}) \quad (9)$$

$$s_{dt} = \sigma_{dt}^s(S_{t-1}). \quad (10)$$

Like before, the processor(s) 110 concatenate $s_{fp} \in \mathbb{R}^F$ and $s_{nb} \in \mathbb{R}^F$ to $S_{t-1}$ to get the augmented shape descriptor $\hat{S}_{t-1} \in \mathbb{R}^{(N_{max}+2) \times F}$, as well as $s_{fn} \in \mathbb{R}^F$ and $s_{dt} \in \mathbb{R}^F$ to $S_t$ to get $\hat{S}_t \in \mathbb{R}^{(N_{max}+2) \times F}$.

As to the residual 310, using the augmented 3D bounding boxes and shape descriptors, the 3D MOT system 170 aims to find three residuals that measure the similarities between current and previous frames' bounding box and shape representations. Since the boxes are low-dimensional abstractions, the aim is to maximize the amount of spatio-temporal information extracted from them. Thus, the processor(s) 110 obtains two residuals for the augmented 3D bounding boxes called the VoxelNet and bounding box residuals, $R_v$ and $R_b$, respectively. The processor(s) 110 also learns one shape residual $R_s$ between the augmented shape descriptors. The processor(s) 110 obtains our overall residual R that captures the spatio-temporal and shape similarities by taking a weighted sum of the three residuals, where the weights are also learned.

Regarding the VoxelNet residual, the first residual $R_v \in \mathbb{R}^{(N_{max}+2) \times (N_{max}+2)}$ is a variation of the VoxelNet bounding box residual. The VoxelNet residual is adapted for the end goal of data association between $\hat{B}_{t-1}$ and $\hat{B}_t$ to capture their similarities based on 3D box center, dimension, and rotation.

Each entry (i, j) in $R_v$ may be defined as follows:

$$L_c(i,j) = \|c_{t-1}^i - c_t^j\|_2^2 \quad (11)$$

$$L_d(i,j) = \left|\log\left(\frac{w_{t-1}^i}{w_t^j}\right)\right| + \left|\log\left(\frac{l_{t-1}^i}{l_t^j}\right)\right| + \left|\log\left(\frac{h_{t-1}^i}{h_t^j}\right)\right| \quad (12)$$

$$L_r(i,j)^2 = \left(\cos\left(r_{y,t-1}^i\right) - \cos\left(r_{y,t}^j\right)\right)^2 + \left(\sin\left(r_{y,t-1}^i\right) - \sin\left(r_{y,t}^j\right)\right)^2 \quad (13)$$

$$R_v(i,j) = \hat{L}_c(i,j) + L_d(i,j) + L_r(i,j) \quad (14)$$

where c:=(x; y; z) is the 3D box center. For the overall residual in Equation 14, $L_c(i,j)$ is normalized to make all the normalized elements $\hat{L}_c(i,j)$ dimensionless like the terms $L_d$ and $L_r$.

As to the bounding box residual, the learned bounding box residual $R_b \in \mathbb{R}^{(N_{max}+2) \times (N_{max}+2)}$ is found by first expanding $\hat{B}_{t-1}$ and $\hat{B}_t$ and concatenating them to get a matrix $\hat{B} \in \mathbb{R}^{(N_{max}+2) \times (N_{max}+2) \times 6}$. Note that for this step. On the box centers from $\hat{B}_{t-1}$ and $\hat{B}_t$ are used. The residual $R_b \in \mathbb{R}^{(N_{max}+2) \times (N_{max}+2)}$ can then be obtained with an MLP $\sigma_r^b$ as such:

$$R_b = \sigma_r^b(\hat{B}). \quad (15)$$

Regarding share residuals, $\hat{S}_t$ and $\hat{S}_{t-1}$ are used to obtain the learned shape residual $R_s$ between the two frames. $\hat{S}_t$ and $\hat{S}_{t-1}$ are expanded and concatenated to get a matrix $\hat{S} \in \mathbb{R}^{(N_{max}+2) \times (N_{max}+2) \times 2F}$. The residual $R_s \in \mathbb{R}^{(N_{max}+2) \times (N_{max}+2)}$ can be obtained with an MLP:

$$R_s = \sigma_r^s(\hat{S}). \quad (16)$$

Regarding the overall residual 310, the overall residual R is a weighted sum of the previously obtained residuals: $R_v$, $R_b$, and $R_s$. $\hat{B}$ and $\hat{S}$ are concatenated to create the input $\hat{W} \in \mathbb{R}^{(N_{max}+2) \times (N_{max}+2) \times (2F+6)}$. Then, this can be passed through an MLP $\sigma_\alpha$ to get the learned weights $\alpha \in \mathbb{R}^{(N_{max}+2) \times (N_{max}+2) \times 3}$ as follows:

$$\alpha = \sigma_\alpha(\hat{W}) \quad (17)$$

The processor(s) 110 may split $\alpha$ into matrices $\alpha_v$, $\alpha_b$, $\alpha_s \in \mathbb{R}^{(N_{max}+2) \times (N_{max}+2)}$, and obtain the overall residual $R \in \mathbb{R}^{(N_{max}+2) \times (N_{max}+2)}$:

$$R = \alpha_v \odot R_v + \alpha_b \odot R_b \alpha_s \odot R_s. \quad (18)$$

(Note that $\odot$ is the Hadamard product.)

The affinity matrix 184, as mentioned before, is estimated using the overall residual 310. Given the overall residual 310, information about the pairwise similarities between current frame detections and previous frame tracks, as well as each of the four augmented anchors, is now known. These spatio-temporal and shape relationships are used to learn probabilities for matching the detections and tracks to each other or the anchors. This will ultimately allow one to leverage global relationships for learning the matching probabilities. In one example, the processor(s) 110 apply an MLP to get the overall affinity matrix A:

$$A = \sigma_{aff}(R). \quad (19)$$

A model that may be used by the 3D MOT system 170 may be trained with the log affinity loss $\mathcal{L}$. One may define the ground-truth affinity matrix $A_{gt}$, the estimated affinity matrix A, and the Hadamard product $\odot$ to get:

$$\mathcal{L}_{la} = \frac{\sum_i \sum_j (A_{gt} \odot -\log(A))}{\sum_i \sum_j A_{gt}}. \quad (20)$$

The affinity matrix prediction has corresponding ground truth matrices $A_{gt,fm}$ and $A_{gt,bm}$ for forward and backward matching, respectively. In total, the overall loss function $\mathcal{L}$ is defined as follows:

$$\mathcal{L}_{fm} = \frac{\sum_i \sum_j (A_{gt,fm} \odot -\log(A_{fm}))}{\sum_i \sum_j A_{gt,fm}} \quad (21)$$

$$\mathcal{L}_{bm} = \frac{\sum_i \sum_j (A_{gt,bm} \odot -\log(A_{bm}))}{\sum_i \sum_j A_{gt,bm}} \quad (22)$$

$$\mathcal{L} = \frac{1}{2}(\mathcal{L}_{fm} + \mathcal{L}_{bm}). \quad (23)$$

The tracking module 192 may also include instructions that cause the processor(s) 110 to perform sequential track confidence refinement. The track confidence should reflect a track's quality relative to the quality of tracks for objects of the same class in a given time step. Thus, to obtain more accurate confidence scores to characterize the tracks, one wants to leverage the affinity matrix estimation as follows: (1) If the affinity matrix indicates that the detection matched to our track has a high probability of being true-positive, take a weighted average between the confidence of our matched detection and the existing confidence of our track. (2) If the affinity matrix indicates that the detection matched to our track almost got eliminated as an FP—only marginally missing the elimination threshold $\tau_{FP}$—then downscale the existing confidence for the track because it likely should not be kept alive with this matched detection.

As such, when the affinity matrix 184 indicates that a current detection has a high probability of being a true positive, the processor(s) 110 takes a weighted average between the confidence of the current detection and the existing confidence of a track matched to the current detection. Conversely, when the affinity matrix 184 indicates that the current detection has a lower probability of being a true positive, the processor(s) 110 downscales the existing confidence of the track matched to the current detection. This approach is described in the following equation:

$$c_{trk,i}^{(t)} \leftarrow \mathbb{1}_{[P_{FP,i}^{(t)} < \beta_1]} \beta_2 c_{det,i}^{(t)} + (1-\beta_2) c_{trk,i}^{(t-1)}$$

$$s.t. \leq c_{det,i}^{(t)} \leq 1 \forall i,t$$

$$0 \leq c_{trk,i}^{(t)} \leq 1 \forall i,t$$

$$0 \leq \beta_1 \leq 1$$

$$0 \leq \beta_1 \leq 1 \quad (24)$$

According to Equation 24, for track ID i at time step t, confidence can be expressed as $c_{trk,i}^{(t)}$. The affinity matrix 184 gets leveraged in the indicator function with $P_{FP,i}^{(t)}$, which is the probability that the detection matched the false-positive anchor at time step t. $\beta_1$ is set to be slightly less than $\tau_{FP}$ to account for detections close to getting eliminated as FP. As such, detections with $P_{FP,i}^{(t)} \in [\beta_1, \tau_{FP}]$ are viewed to be very uncertain detections, and this is taken into account by reducing the overall track confidence for tracks matching to such detections. However, if the matched detection has a very high probability of being true-positive, then the track confidence $c_{trk,i}^{(t)}$ becomes a weihted average between $c_{det,i}^{(t)}$ and $c_{trk,i}^{(t-1)}$.

Based on cross-validation, it was found that this refinement technique is not sensitive to values for $\beta_1$ and $\beta_2$—in fact, setting $\beta_1=0.5$ for all object classes and $\beta_2=0.5$ for all object classes except for bicycle ($\beta_2=0.4$), bus ($\beta_2=0.7$), and trailer ($\beta_2=0.4$). In the case of bicycle and trailer, $\beta_2$ was selected to be slightly lower to give more weight to the fact that it has been tracked since 3D detectors tend not to be very good on these object types and thus skew towards lower detection confidence scores. For the converse reason, bus has a higher $\beta_2$.

In the special case of a newborn track, the track confidence is only the first term of Equation 24, i.e.

$$c_{trk,i}^{(t)} \leftarrow \mathbb{1}_{[P_{FO,i}^{(t)} < \beta_1]} \beta_2 c_{det,i}^{(t)}.$$

It has been observed that this works well because the detection confidences are also created in relative terms. Thus, if all newly initialized track confidences are the detection confidences scaled with $\beta_2$, their relative confidence rankings will be preserved.

As such, the 3D MOT system 170 leverages shape and spatio-temporal information from point cloud data to learn affinities for robust data association, track lifecycle management, FP elimination, FN propagation, and track confidence refinement. This approach effectively addresses false-positives and missing detections against cluttered scenes and occlusion, yielding state-of-the-art performance.

Figure 7:
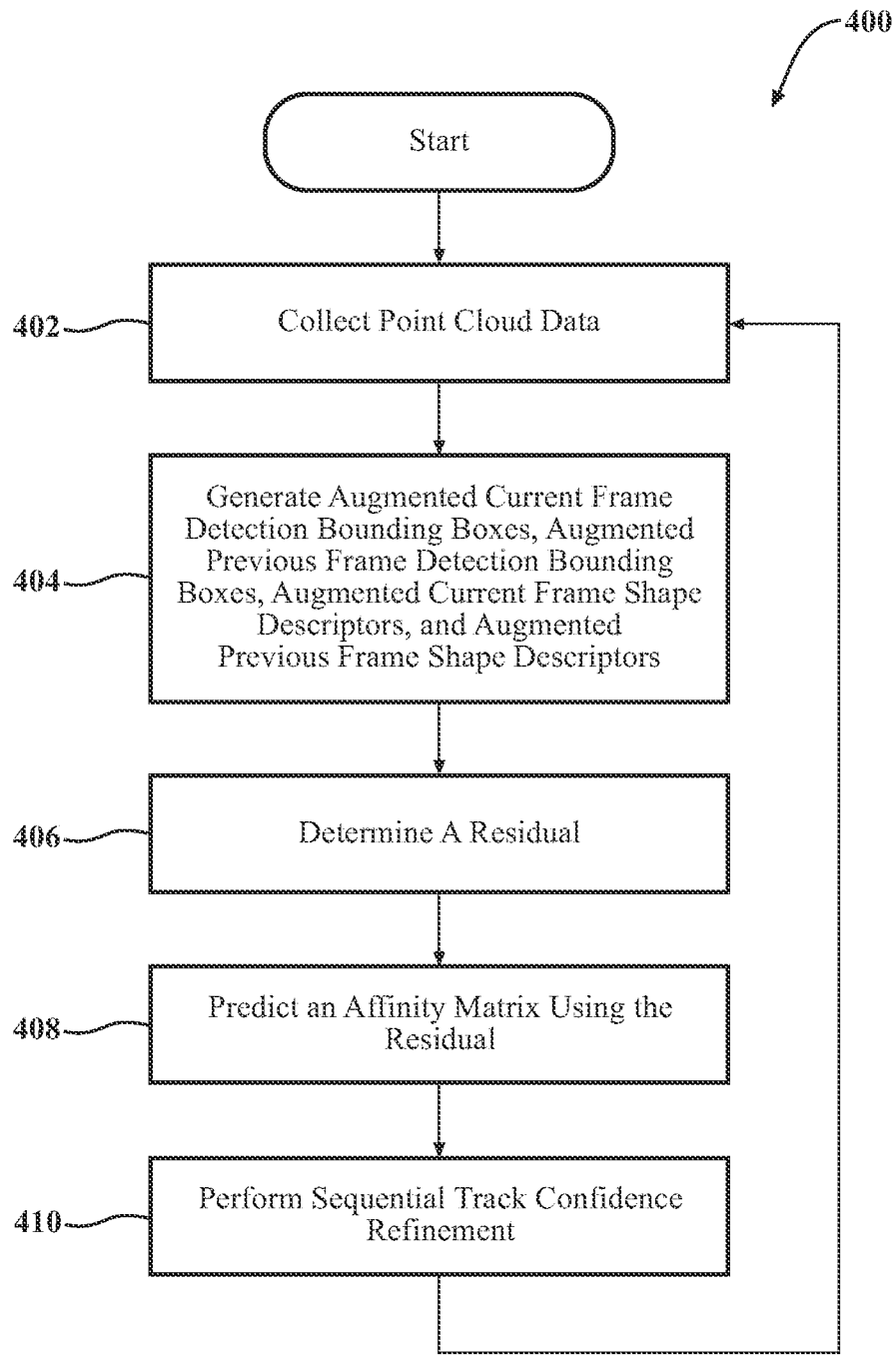
FIG. 7 illustrates a method for performing 3D MOT.

Referring to FIG. 7, a method 400 for performing 3D MOT is shown. The method 400 will be described from the viewpoint of the 3D MOT system 170 of FIG. 3 and will refer to the flowchart 300 of FIG. 4. However, it should be understood that this is just one example of implementing the method 400. While method 400 is discussed in combination with the 3D MOT system 170, it should be appreciated that the method 400 is not limited to being implemented within the 3D MOT system 170, but is instead one example of a system that may implement the method 400.

Also, it should be understood that the method 400 may include any of the procedures, steps, methodologies, algorithms, and the like described in the paragraphs above. As such, it should be understood that method 400 may only describe some of the functionality of performing 3D MOT, but additional functionality described in the paragraphs above can be incorporated within the method 400.

In step 402, the method 400 begins by collecting point cloud data 182A and 182B at two different time steps. The point cloud data 182A and 182B may be point cloud data originating from a sensor, such as a LIDAR sensor and/or other types of depth sensors. As mentioned, the point cloud data 182 can also be pseudo-LIDAR data generated using a depth map back-projected into a 3D space.

In step 404, the tracking module 192 includes instructions that, when executed by the processor(s) 110, cause the processor(s) 110 to generate augmented current frame detection bounding boxes 304B, augmented previous frame detection bounding boxes 304A, augmented current frame shape descriptors 308B, and augmented previous frame shape descriptors 308A. Moreover, as explained before, the 3D MOT system 170 uses $N_{max}$ low-dimensional bounding boxes 302A and 302B from the current and previous frames to learn bounding box representations for the FP, NB, FN, and DT anchors. The instructions of the tracking module 192 cause the processor(s) 110 to append the FP and NB anchors to previous frame bounding boxes to form the augmented bounding boxes $\hat{B}_{t-1}$ (previous frame augmented bounding boxes 304A), while the FN and DT anchors are added by the processor(s) 110 to the current frame detections to form the augmented bounding boxes $\hat{B}_t$ (current frame augmented bounding boxes 304B).

Using a pre-trained frozen LIDAR backbone, which can be extracted from off-the-shelf detector that receives point cloud data 182A and 182B at two different time steps, the instructions of the tracking module 192 cause the processor(s) 110 to utilize current and previous frame shape descriptors 306A and 306B to learn shape representations for the anchors. The learned shape representations for the anchors are appended by the processor(s) 110 to create augmented current and previous frame shape descriptors 308A and 308B, respectively.

In step 406, the tracking module 192 includes instructions that, when executed by the processor(s) 110, cause the processor(s) 110 to use these augmented bounding boxes 304A and 304B and augmented shape descriptors 308A and 308B to determine a residual 310 that captures the spatio-temporal and shape similarities between current and previous frame detections, as well as between detections and anchors.

In step 408, the tracking module 192 includes instructions that, when executed by the processor(s) 110, cause the processor(s) 110 to predict the affinity matrix 184 for probabilistic data associations, track lifecycle management, FP elimination, FN propagation, and track confidence refinement using the residual 310.

In step 410, the tracking module 192 includes instructions that, when executed by the processor(s) 110, cause the processor(s) 110 to perform sequential track confidence refinement. Moreover, when the affinity matrix 184 indicates that a current detection has a high probability of being a true positive, the processor(s) 110 to takes a weighted average between a confidence of the current detection and an existing confidence of a track matched to the current detection. Conversely, when the affinity matrix 184 indicates that the current detection has a lower probability of being a true positive, the processor(s) 110 downscales the existing confidence of the track matched to the current detection.

As such, the 3D MOT system 170 and method 400 leverage shape and spatio-temporal information from point cloud data to learn affinities for robust data association, track lifecycle management, FP elimination, FN propagation, and track confidence refinement. This approach effectively addresses false-positives and missing detections against cluttered scenes and occlusion, yielding state-of-the-art performance.

FIG. 1 will now be discussed in full detail as an example environment within which the system and methods disclosed herein may operate. Again, as mentioned before, incorporating the 3D MOT system 170 and/or the method 400 with an automobile is but one example implementation. Other implementations outside of automobiles are also possible.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, and hills. The static obstacles can be objects that extend above ground level. The one or more static obstacles included in the static obstacle map(s) 118 can have location data, size data, dimension data, material data, and/or other associated data. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify, and/or sense other things in the external environment of the vehicle 100, such as lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, arrangement, or group that enables information/data to be entered into a machine. The input system 130 can receive an input from a vehicle passenger (e.g., a driver or a passenger). The vehicle 100 can include an output system 135. An "output system" includes any device, component, arrangement, or group that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110 and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140 and, thus, may be partially or fully autonomous.

The processor(s) 110 and/or the autonomous driving system 160 can be operatively connected to communicate with the vehicle systems 140 and/or individual components thereof. For example, returning to FIG. 1, the processor(s) 110 and/or the autonomous driving system 160 can be in communication to send and/or receive information from the vehicle systems 140 to control the movement, speed, maneuvering, heading, direction, etc. of the vehicle 100. The processor(s) 110 and/or the autonomous driving system 160 may control some or all of these vehicle systems 140.

The processor(s) 110 and/or the autonomous driving system 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving system 160 can control the direction and/or speed of the vehicle 100. The processor(s) 110 and/or the autonomous driving system 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either directly or indirectly.

The vehicle 100 can include one or more actuators 150. The actuators 150 can be any element or combination of elements operable to modify, adjust and/or alter one or more of the vehicle systems 140 or components to respond to receiving signals or other inputs from the processor(s) 110 and/or the autonomous driving system 160. Any suitable actuator can be used. For instance, the one or more actuators 150 can include motors, pneumatic actuators, hydraulic pistons, relays, solenoids, and/or piezoelectric actuators, to name a few possibilities.

The vehicle 100 can include one or more modules, at least some of which are described herein. The modules can be implemented as computer-readable program code that, when executed by a processor(s) 110, implements one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include an autonomous driving system 160. The autonomous driving system 160 can be configured to receive data from the sensor system 120 and/or any other type of system capable of capturing information relating to the vehicle 100 and/or the external environment of the vehicle 100. In one or more arrangements, the autonomous driving system 160 can use such data to generate one or more driving scene models. The autonomous driving system 160 can determine position and velocity of the vehicle 100. The autonomous driving system 160 can determine the location of obstacles, obstacles, or other environmental features, including traffic signs, trees, shrubs, neighboring vehicles, pedestrians, etc.

The autonomous driving system 160 can be configured to receive and/or determine location information for obstacles within the external environment of the vehicle 100 for use by the processor(s) 110 and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving system 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, to name a few possibilities. The autonomous driving system 160 can be configured to implement determined driving maneuvers. The autonomous driving system 160 can cause, directly or indirectly, such autonomous driving maneuvers to be implemented. As used herein, "cause" or "causing" means to make, command, instruct, and/or enable an event or action to occur or at least be in a state where such event or action may occur, either directly or indirectly. The autonomous driving system 160 can be configured to execute various vehicle functions and/or transmit data to, receive data from, interact with, and/or control the vehicle 100 or one or more systems (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code comprising one or more executable instructions for implementing the specified logical function(s). It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any processing system or apparatus adapted for the methods described herein is suited. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and which, when loaded in a processing system, can carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. For example, "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereto.

What is claimed is:

1. A system for three-dimensional multi-object tracking comprising:
    a processor; and
    a memory having instructions that, when executed by the processor, cause the processor to:
        determine a residual based on augmented current frame detection bounding boxes, augmented previous frame detection bounding boxes, augmented current frame shape descriptors, and augmented previous frame shape descriptors, the residual indicating a spatiotemporal and shape similarity between current detections in a current frame point cloud data and previous detections in a previous frame point cloud data, and
        predict an affinity matrix using the residual, the affinity matrix indicating associations between the previous detections and the current detections, wherein the affinity matrix includes a first dimension that is correlated with the previous detections and includes information regarding a newborn track anchor and a false positive anchor and a second dimension that is correlated with the current detections and includes information regarding a false negative anchor and a dead track anchor,
        wherein the affinity matrix identifies matches between tracks and detections, and
        control a movement of a vehicle using the affinity matrix.

2. The system of claim 1, wherein the memory further includes instructions that, when executed by the processor, cause the processor to:
    generate the augmented current frame detection bounding boxes by appending a bounding box of an object that was not detected in the current frame and a last known or previous frame bounding box that is not active to the current frame detection bounding boxes based on the current detections,
    generate the augmented previous frame detection bounding boxes by appending a predicted bounding box that does not match an object and a first bounding box of a newly tracked object to previous frame detection bounding boxes based on the previous detections,
    generate the augmented current frame shape descriptors by appending a false negative anchor's shape descriptor and a dead track anchor's shape descriptor to the current frame shape descriptors based on the current shape descriptors, and
    generate the augmented previous frame shape descriptors by appending a false positive anchor's shape descriptor and newborn track anchor's shape descriptor to a previous frame shape descriptors based on the current shape descriptors.

3. The system of claim 2, wherein:
    the current frame detection bounding boxes describe 3D locations, dimensions, and rotations of the current detections;
    the previous frame detection bounding boxes describe 3D locations, dimensions, and rotation of the previous detections;
    the previous frame shape descriptors describe shapes of the previous detections; and
    the current frame shape descriptors describe shapes of the current detections.

4. The system of claim 1, wherein the memory further includes instructions for performing sequential track confidence refinement that, when executed by the processor, cause the processor to:
    when the affinity matrix indicates that a current detection has a high probability of being a true positive, take a weighted average between a confidence of the current detection and an existing confidence of a track matched to the current detection, and
    when the affinity matrix indicates that the current detection has a lower probability of being a true positive, downscale the existing confidence of the track matched to the current detection.

5. The system of claim 1, wherein the previous frame point cloud data and the current frame point cloud data was generated by a light detection and ranging sensor.

6. The system of claim 5, wherein the light detection and ranging sensor is mounted to the vehicle.

7. A method for three-dimensional multi-object tracking comprising steps of:
determining a residual based on augmented current frame detection bounding boxes, augmented previous frame detection bounding boxes, augmented current frame shape descriptors, and augmented previous frame shape descriptors, the residual indicating a spatiotemporal and shape similarity between current detections in a current frame point cloud data and previous detections in a previous frame point cloud data;
predicting an affinity matrix using the residual, the affinity matrix indicating associations between the previous detection and the current detection, wherein the affinity matrix includes a first dimension that is correlated with the previous detections and includes information regarding a newborn track anchor and a false positive anchor and a second dimension that is correlated with the current detections and includes information regarding a false negative anchor and a dead track anchor; and
controlling a movement of a vehicle using the affinity matrix.

8. The method of claim 7, further comprising steps of:
generating the augmented current frame detection bounding boxes by appending a bounding box of an object that was not detected in the current frame and a last known or previous frame bounding box that is not active to current frame detection bounding boxes based on the current detections;
generating the augmented previous frame detection bounding boxes by appending a predicted bounding box that does not match an object and a first bounding box of a newly tracked object to previous frame detection bounding boxes based on the previous detections;
generating the augmented current frame shape descriptors by appending a false negative anchor's shape descriptor and a dead track anchor's shape descriptor to the current frame shape descriptors based on the current shape descriptors; and
generating the augmented previous frame shape descriptors by appending a false positive anchor's shape descriptor and newborn track anchor's shape descriptor to a previous frame shape descriptors based on the current shape descriptors.

9. The method of claim 8, wherein:
the current frame detection bounding boxes describe 3D locations, dimensions, and rotations of the current detections;
the previous frame detection bounding boxes describe 3D locations, dimensions, and rotation of the previous detections;
the previous frame shape descriptors describe shapes of the previous detections; and
the current frame shape descriptors describe shapes of the current detections.

10. The method of claim 7, further comprising performing sequential track confidence refinement, the steps of sequential track confidence refinement include:
when the affinity matrix indicates that a current detection has a high probability of being a true positive, taking a weighted average between a confidence of the current detection and an existing confidence of a track matched to the current detection; and
when the affinity matrix indicates that the current detection has a lower probability of being a true positive, downscaling the existing confidence of the track matched to the current detection.

11. The method of claim 7, wherein the previous frame point cloud data and the current frame point cloud data was generated by a light detection and ranging sensor.

12. The method of claim 11, wherein the light detection and ranging sensor is mounted to the vehicle.

13. A non-transitory computer-readable medium storing instructions for performing three-dimensional multi-object tracking, the instructions, when executed by a processor, cause the processor to:
determine a residual based on augmented current frame detection bounding boxes, augmented previous frame detection bounding boxes, augmented current frame shape descriptors, and augmented previous frame shape descriptors, the residual indicating a spatiotemporal and shape similarity between current detections in a current frame point cloud data and previous detections in a previous frame point cloud data;
predict an affinity matrix using the residual, the affinity matrix indicating associations between the previous detection and the current detection, wherein the affinity matrix includes a first dimension that is correlated with the previous detections and includes information regarding a newborn track anchor and a false positive anchor and a second dimension that is correlated with the current detections and includes information regarding a false negative anchor and a dead track anchor; and
control a movement of a vehicle using the affinity matrix.

14. The non-transitory computer-readable medium of claim 13, further including instructions that, when executed by the processor, cause the processor to:
generate the augmented current frame detection bounding boxes by appending a bounding box of an object that was not detected in the current frame and a last known or previous frame bounding box that is not active to the current frame detection bounding boxes based on the current detections;
generate the augmented previous frame detection bounding boxes by appending a predicted bounding box that does not match an object and a first bounding box of a newly tracked object to a previous frame detection bounding boxes based on the previous detections;
generate the augmented current frame shape descriptors by appending a false negative anchor's shape descriptor and a dead track anchor's shape descriptor to the current frame shape descriptors based on the current shape descriptors; and
generate the augmented previous frame shape descriptors by appending a false positive anchor's shape descriptor and newborn track anchor's shape descriptor to a previous frame shape descriptors based on the current shape descriptors.

15. The non-transitory computer-readable medium of claim 14, wherein:
the current frame detection bounding boxes describe 3D locations, dimensions, and rotations of the current detections;
the previous frame detection bounding boxes describe 3D locations, dimensions, and rotation of the previous detections;
the previous frame shape descriptors describe shapes of the previous detections; and
the current frame shape descriptors describe shapes of the current detections.

16. The non-transitory computer-readable medium of claim 13, further including instructions for performing sequential track confidence refinement that, when executed by the processor, cause the processor to:
   when the affinity matrix indicates that a current detection has a high probability of being a true positive, take a weighted average between a confidence of the current detection and an existing confidence of a track matched to the current detection; and
   when the affinity matrix indicates that the current detection has a lower probability of being a true positive, downscale the existing confidence of the track matched to the current detection.

17. The non-transitory computer-readable medium of claim 13, wherein the previous frame point cloud data and the current frame point cloud data was generated by a light detection and ranging sensor.

\* \* \* \* \*